United States Patent
Pignataro et al.

(10) Patent No.: US 9,276,833 B2
(45) Date of Patent: Mar. 1, 2016

(54) PATH-PING AND ECMP-TRACEROUTE FOR IPV6 OVERLAY VIRTUALIZED NETWORKS

(71) Applicant: Cisco Technology, Inc., San Jose, CA (US)

(72) Inventors: Carlos M. Pignataro, Raleigh, NC (US); Nagendra Kumar, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 266 days.

(21) Appl. No.: 13/949,538

(22) Filed: Jul. 24, 2013

(65) Prior Publication Data

US 2015/0029872 A1 Jan. 29, 2015

(51) Int. Cl.
*H04L 12/26* (2006.01)

(52) U.S. Cl.
CPC ........................... *H04L 43/10* (2013.01)

(58) Field of Classification Search
USPC .............. 370/229, 235, 236, 241.1, 242, 248, 370/249, 252
See application file for complete search history.

(56) References Cited

U.S. PATENT DOCUMENTS

| | | | |
|---|---|---|---|
| 7,746,796 B2 | 6/2010 | Swallow et al. | |
| 7,895,425 B2 | 2/2011 | Khalid et al. | |
| 8,199,658 B2 | 6/2012 | Vasseur et al. | |
| 2008/0285466 A1 | 11/2008 | Salam et al. | |
| 2009/0116396 A1* | 5/2009 | Regan et al. | 370/248 |
| 2011/0317696 A1 | 12/2011 | Aldrin et al. | |
| 2014/0092751 A1* | 4/2014 | Meilik et al. | 370/241.1 |
| 2014/0348006 A1* | 11/2014 | Jain et al. | 370/245 |
| 2014/0351645 A1* | 11/2014 | Jain et al. | 714/37 |
| 2015/0109907 A1* | 4/2015 | Akiya et al. | 370/229 |

OTHER PUBLICATIONS

Bahadur, et al., "Mechanism for Performing Label Switched Path Ping (LSP Ping) Over MPLS Tunnels", Internet Engineering Task Force, Request for Comments 6424, Nov. 2011, 23 pages, Internet Engineering Task Force Trust.

Bitar, et al., "NVO3 Data Plane Requirements", Internet Draft, draft-ietf-nvo3-dataplane-requirements-00.txt, Dec. 2012, 19 pages, The Internet Engineering Task Force Trust.

Kompella, et al., "Detecting Multi-Protocol Label Switched (MPLS) Data Plane Failures", Network Working Group, Request for Comments 4379, Feb. 2006, 50 pages, The Internet Society.

Melnikov, et al., "Message Disposition Notification (MDN) Profile for Internet Message Access Protocol (IMAP)", Network Working Group, Request for Comments 3503, Mar. 2003, 9 pages, The Internet Society.

* cited by examiner

*Primary Examiner* — Kwang B Yao
*Assistant Examiner* — Nguyen Ngo
(74) *Attorney, Agent, or Firm* — Parker Ibrahim & Berg LLC; James M. Behmke; Stephen D. LeBarron (57) ABSTRACT

In one embodiment, an ingress network virtualization edge (NVE) in a computer network generates an echo packet, and sets an indication in the echo packet that the echo packet is for overlay path validation. In addition, the ingress NVE sets a message type of the echo packet to a generic echo request, and includes virtualization network (VN) context information within the echo packet. Once setting a destination address of the echo packet as an egress NVE address and including an indication to the egress NVE that the echo packet is an operations, administration, and management (OAM) message, the ingress NVE may then send the echo packet toward the egress NVE (e.g., to validate the VN context information and/or to reveal multipath traces).

23 Claims, 8 Drawing Sheets

PATH-PING AND ECMP-TRACEROUTE FOR IPV6 OVERLAY VIRTUALIZED NETWORKS

TECHNICAL FIELD

The present disclosure relates generally to computer networks, and, more particularly, to path-ping and equal cost multipath (ECMP) traceroute for Internet Protocol version 6 (IPv6) overlay virtualized networks.

BACKGROUND

Network Virtualization is an emerging technology in the market. For instance, advances regarding Network Virtualization over Layer 3 (NVO3) have been made recently, such as proposing to use plain IPv4 and IPv6 encapsulation as an overlay tunnel. For example, one internet draft proposed to the Internet Engineering Task Force (IETF) entitled "NVO3 Data Plane Requirements"<draft-ietf-nvo3-dataplane-requirements>, by Bitar et al. (December 2012), describes underlay tunneling requirements, which, from an encapsulation perspective, must support IPv4 or IPv6 (both should be supported), while multiprotocol label switching (MPLS) tunneling may be supported. In addition, this same draft states that operations, administration, and management (OAM) tools used in a network virtualization (NV) topology must reveal the set of equal cost multipath (ECMP) paths used by NVO3 encapsulated packets in the underlying network from an ingress NV edge (NVE) to egress NVE (particularly when the core is non-MPLS), and to validate the L2 and L3 VN Context ID between NVEs for consistency. However, such tools have yet to be defined.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an ingress network virtualization edge (NVE) in a computer network generates an echo packet, and sets an indication in the echo packet that the echo packet is for overlay path validation. In addition, the ingress NVE sets a message type of the echo packet to a generic echo request, and includes virtualization network (VN) context information within the echo packet. Once setting a destination address of the echo packet as an egress NVE address and including an indication to the egress NVE that the echo packet is an operations, administration, and management (OAM) message, the ingress NVE may then send the echo packet toward the egress NVE. In one embodiment, sending the echo packet toward the egress NVE causes the egress NVE to send an echo reply to the ingress NVE according to validation of the VN context information. In another embodiment, the ingress NVE includes multipath information within the echo packet to cause each intermediate multipath receiver to reply with a respective flow label and mask for each egress interface of that multipath receiver, and sending the echo packet toward the egress NVE comprises sending a plurality of echo packets with incrementally increasing hop limits.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 1:
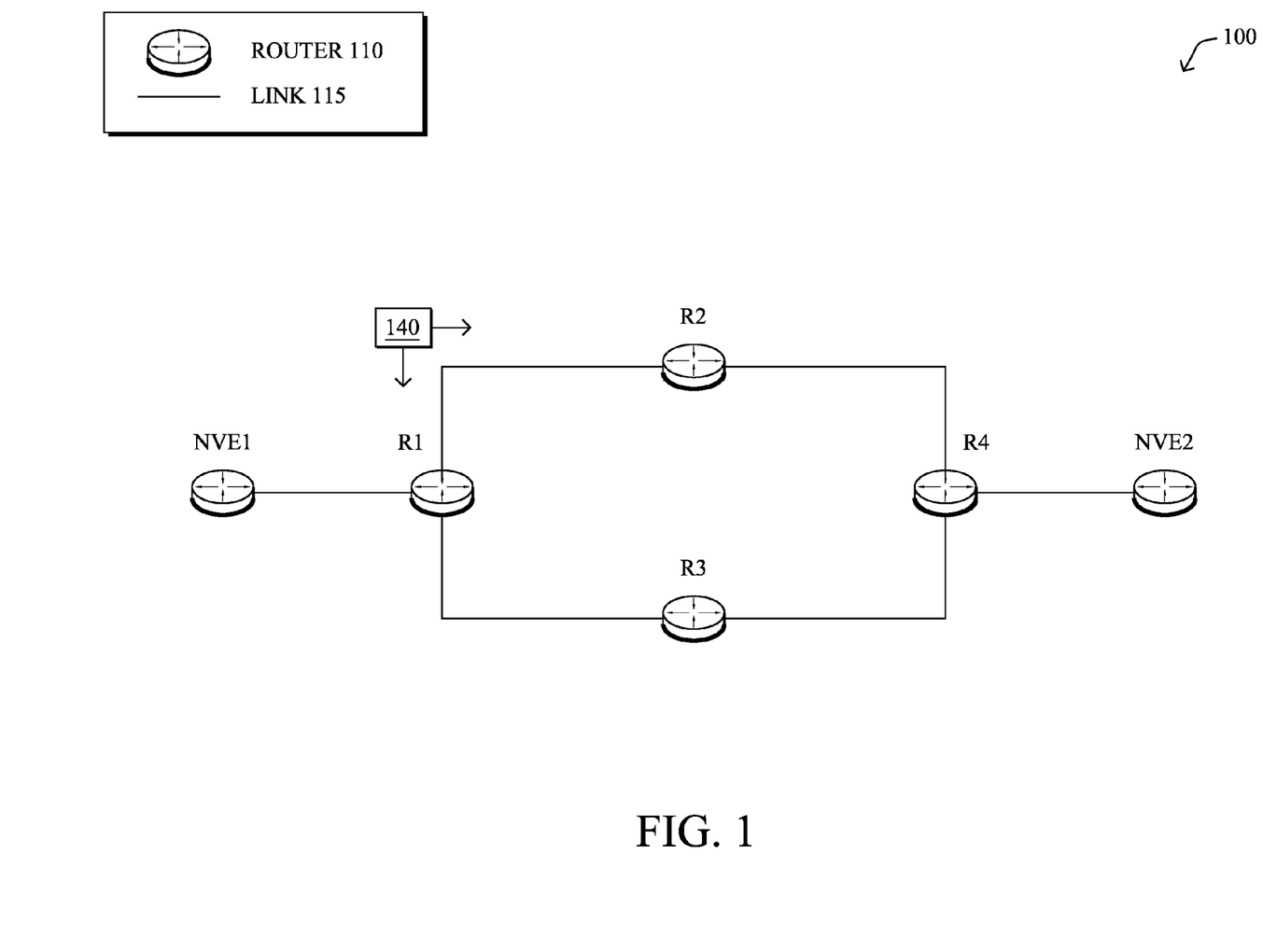
FIG. 1 illustrates an example computer network.

FIG. 1 is a schematic block diagram of an example computer network 100 illustratively comprising nodes/devices, such as a plurality of routers 110 (e.g., "NVE1", R1-R4, and "NVE2") interconnected by links 115, as shown. As used herein, links may be labeled by their corresponding endpoints, such as the link between nodes R1 and R2 being referred to herein as "link R1-R2" (or equally "link R2-R1"). Those skilled in the art will understand that any number of nodes, devices, links, etc. may be used in the computer network, and that the view shown herein is for simplicity. Those skilled in the art will also understand that while the embodiments described herein is described generally, it may apply to any network configuration within an Autonomous System (AS) or area, or throughout multiple ASes or areas, etc.

Data packets 140 (e.g., traffic/messages) may be exchanged among the nodes/devices 110 of the computer network 100 over links 115 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
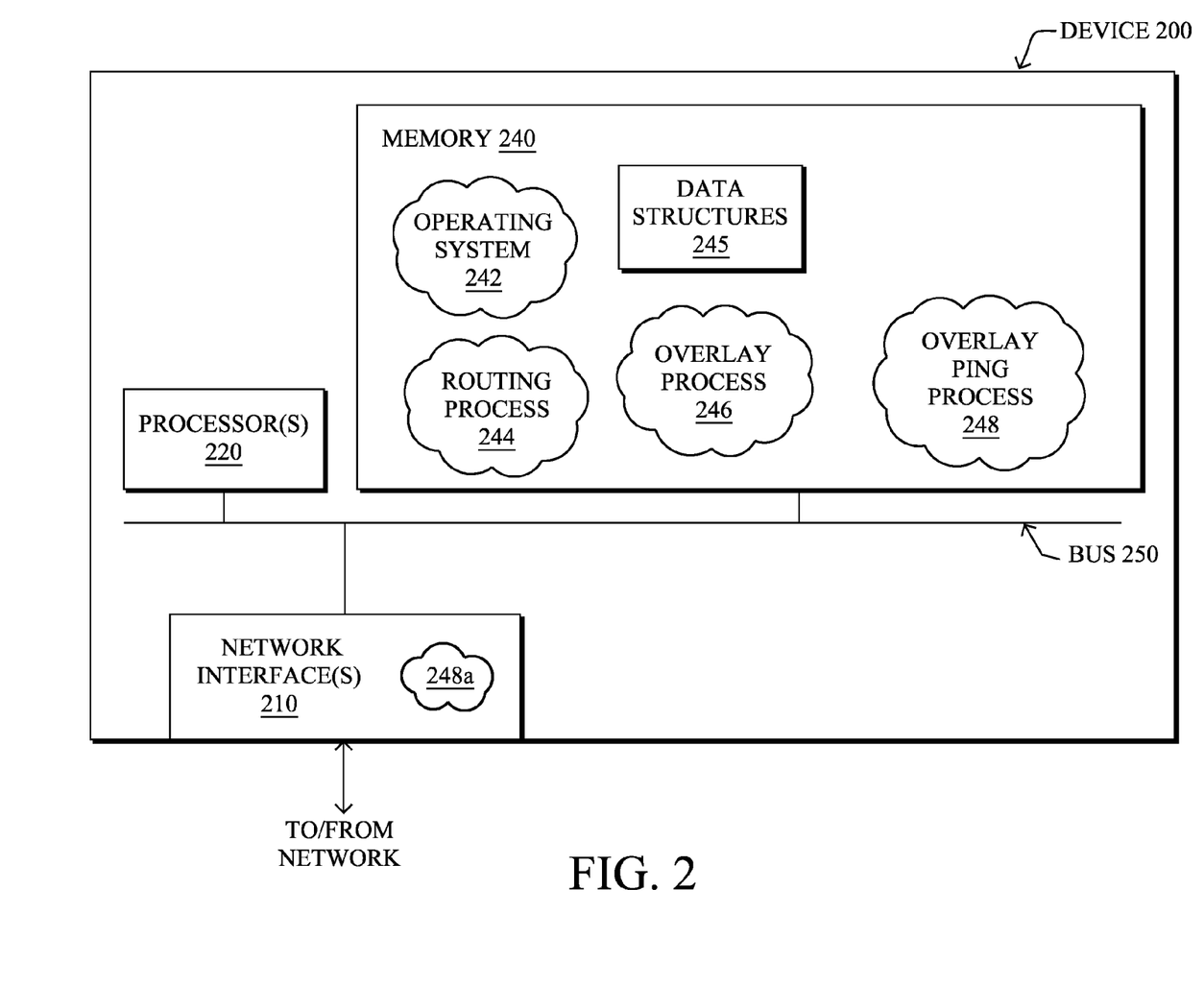
FIG. 2 illustrates an example network device/node.

FIG. 2 is a schematic block diagram of an example node/device 200 that may be used with one or more embodiments described herein, e.g., as an NVE (e.g., ingress NVE). The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing services 244 and an overlay process 246 that may, for example, facilitate the operation of network overlay protocols as described herein. Additionally, these software processes and/or services may further comprise an "overlay ping" process 248, as described herein, which may alternatively be located within individual network interfaces (e.g., process 248a).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database (not shown) containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 244 may also perform functions related to virtual routing protocols, such as maintaining VRF instances (not shown), or tunneling protocols, such as for Multi-Protocol Label Switching (MPLS), generalized MPLS (GMPLS), etc., each as will be understood by those skilled in the art.

Overlay process 246 contains computer executable instructions executed by processor 220 to perform functions provided by one or more overlay-based protocols, such as Network Virtualization over Layer 3 (NVO3). In particular, as noted above, Network Virtualization is an emerging technology in the market. An overlay network, as will be understood by those skilled in the art, is a computer network which is built on the top of another network, where nodes in the overlay can be thought of as being connected by virtual or logical links, each of which corresponds to a path, perhaps through many physical links, in the underlying network. For example, distributed systems such as cloud computing, peer-to-peer networks, and client-server applications are overlay networks because their nodes run on top of the Internet. Illustratively, FIG. 1 may represent a simplified overlay topology (e.g., an NVO3 over IPv6 topology), where network virtualization edge (NVE) devices NVE1 and NVE2 provide ingress and egress to the virtualized network. That is, R1-R4 are nodes as part of an IP or MPLS overlay network that connects NVE1 and NVE2 which acts as edge nodes that provide an L2 or L3 virtualized network.

As also noted above, advances regarding NVO3 have been made recently, such as proposing to use plain IPv4 and IPv6 encapsulation as an overlay tunnel. For example, one internet draft proposed to the Internet Engineering Task Force (IETF) entitled "NVO3 Data Plane Requirements"<draft-ietf-nvo3-dataplane-requirements>, by Bitar et al. (December 2012), describes underlay tunneling requirements, which, from an encapsulation perspective, must support IPv4 or IPv6 (both should be supported), while multiprotocol label switching (MPLS) tunneling may be supported. In addition, this same draft states that operations, administration, and management (OAM) tools used in a network virtualization (NV) topology must reveal the set of equal cost multipath (ECMP) paths used by NVO3 encapsulated packets in the underlying network from an ingress NV edge (NVE) to egress NVE (particularly when the core is non-MPLS), and to validate the L2 and L3 VN Context ID between NVEs for consistency. However, such tools have yet to be defined. In particular, the Internet Control Management Protocol (ICMP) "ping" messages are not suitable for ECMP paths, since the hashing algorithm used by multipath branching devices may result in different path selection for different flows. Brute force techniques to use an ICMP ping (e.g., attempting all combinations of source address/port, destination address/port, etc.) are cumbersome and overly taxing on the network.

Path-Ping and ECMP-Traceroute

The techniques herein provide VN Context validation on an IPv6 core (e.g., non-MPLS NVO3, as well as ECMP tree trace (revealing all ECMPs between NVEs). In general, the intentions for this OAM is that an egress node should differentiate NVO3 dataplane traffic and NVO3 OAM packets, and NVO3 OAM packet payloads should carry VN Context IDs and associated details that egress NVEs can use for validation. To accomplish this, the techniques herein propose a scheme similar to MPLS LSP Ping (as described in the IETF Request for Comment (RFC) 4379, entitled "Detecting Multi-Protocol Label Switched (MPLS) Data Plane Failures") by repurposing and extending MPLS LSP Ping machinery to function appropriately on a "plain" IPv6 network as described below.

In particular, as detailed below, a new packet format to validate NVO3 overlay paths is defined that expands LSP Ping in a manner that provides the desired outcome in (non-MPLS) overlay networks (e.g., but that re-uses the same user datagram protocol (UDP) port). For instance, the IPv6 destination of an echo request packet is set as the egress NVE address, and a new IPv6 Destination Header Option (or other mechanism) is defined to indicate that this packet is an OAM message. Moreover, a new flag (e.g., in a "Global Flags" field) may be set to signal the OAM payload for NVO3 overlay validation (i.e., to differentiate between LSP Ping and non-LSP Ping), where generic echo request/reply types may be defined. The OAM payload may be populated by new fields (e.g., TLVs/sub-TLVs (type-length-value fields) that identify the VN Context ID to be validated by egress NVE or other needs. Lastly, as described below, a downstream detailed mapping (DDMAP) format may be re-used (e.g., from RFC6424, entitled "Mechanism for Performing Label Switched Path Ping (LSP Ping) over MPLS Tunnels"), while introducing a new Multipath Data Type (e.g., for "IPv6 Flow Label").

Illustratively, the techniques described herein may be performed by hardware, software, and/or firmware, such as in accordance with the "overlay ping" process 248/248a, which may contain computer executable instructions executed by the processor 220 (or independent processor of interfaces 210) to perform functions relating to the techniques described herein, e.g., in conjunction with routing process 244 and/or overlay process 246. For example, the techniques herein may be treated as extensions to conventional protocols, and as such, may be processed by similar components understood in the art that execute those protocols, accordingly.

Figure 3:
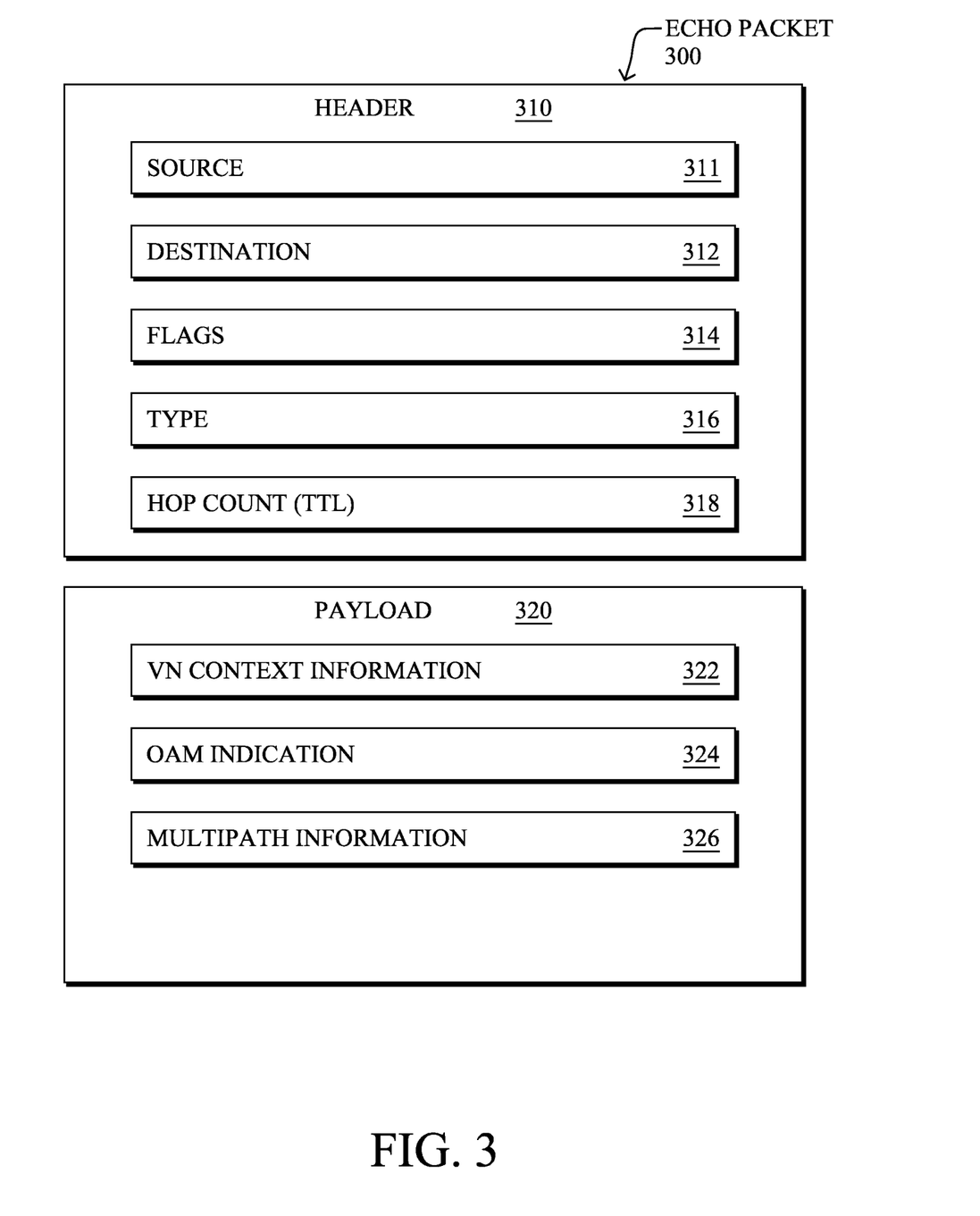
FIG. 3 illustrates an example simplified echo packet format.

Operationally, an "overlay ping" generic behavior is prompted at an ingress NVE (e.g., NVE1) and comprises generating an echo packet, such as shown in FIG. 3. In particular, in the illustrative example packet format, a packet header 310 indicates a source 311 and destination 312 of the packet, but may also include a new bit (e.g., in a global flags field 314) that can be used to signal that this echo packet is to validate a non-MPLS (NVO3 overlay) path (that is, an indication that the echo packet is for overlay path validation). In addition, two new message types (field 316) are defined for requests and replies to validate NVO3 paths, such as a generic echo request (e.g., Value X) and a generic echo reply (e.g., Value Y). Also, for use with ECMP traceroute (described below), a hop count (or time-to-live, TTL) field 318 may also be present within the header 310. Notably, where a format similar to the MPLS LSP Ping is used, certain other fields may remain without change, such as a Reply Mode, Sender's Handle, Sequence Number, TimeStamp Sent/Received, etc., as will be understood by those skilled in the art.

The payload 320 of the echo packet 300 may comprise one or more new TLVs/Sub-TLVs or other fields that can be used to validate the VN Context Identification, that is, fields that include virtualization network (VN) context information 322 within the echo packet (e.g., the VN context identifier (ID) and associated VN context details). Moreover, the packet 300 may also include an indication 324 (to the egress NVE) that the packet is an OAM message. In one embodiment, the indication comprises a specific user datagram protocol (UDP) port and destination port, such that the egress NVE may inspect those fields to determine the OAM intention. Alternatively, an explicit indication may be used, such as a new IPv6 Destination Header Option as OAM-OPTION to carry a flag stating that the packet 300 is an OAM packet. (Note that while the OAM indication field 324 is shown in the payload 320, the field may actually be located within the header 310, and the view shown herein is merely an example implementation.)

Figure 4:
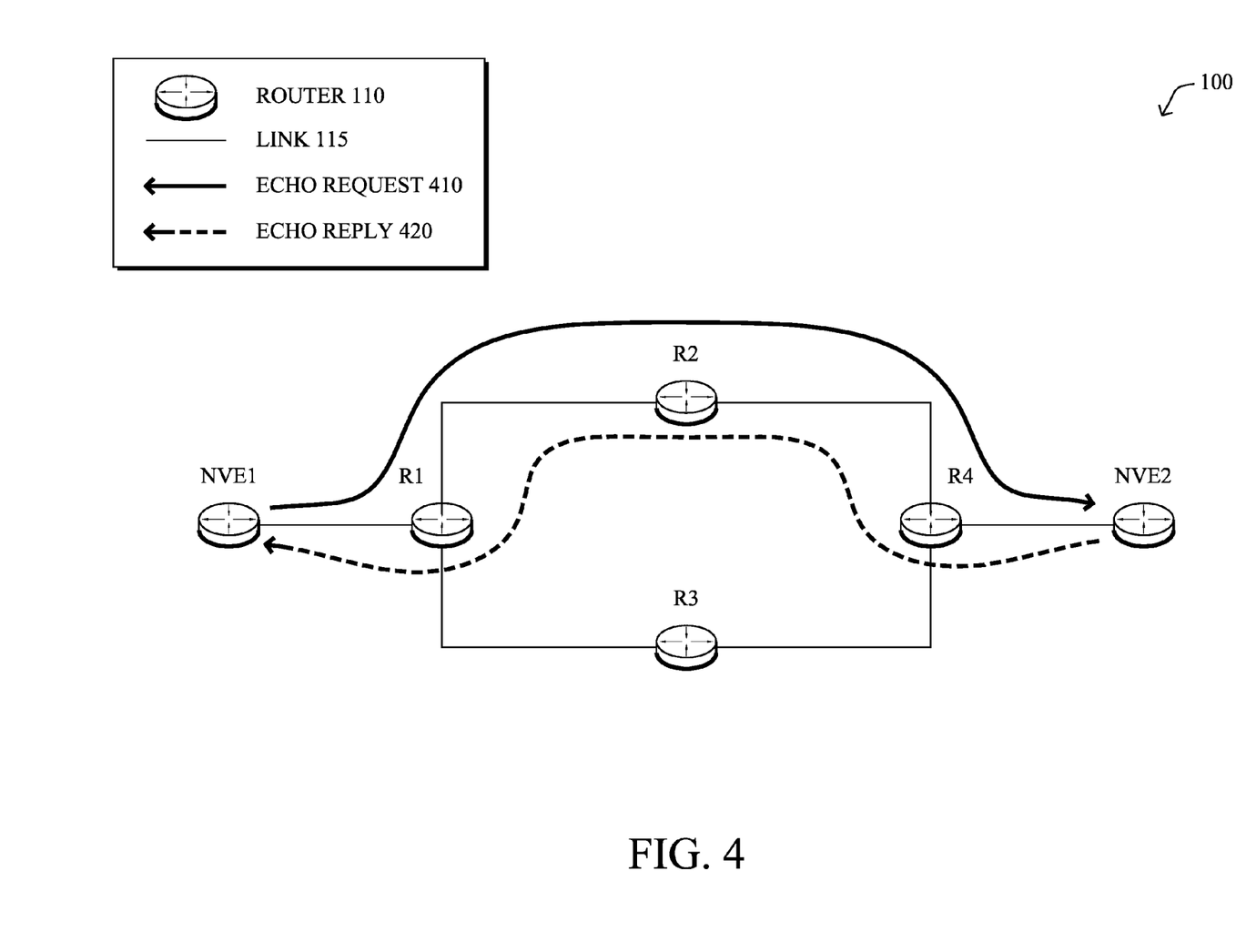
FIG. 4 illustrates an example of path-ping for IPv6 overlay virtualized networks.
Figure 5:
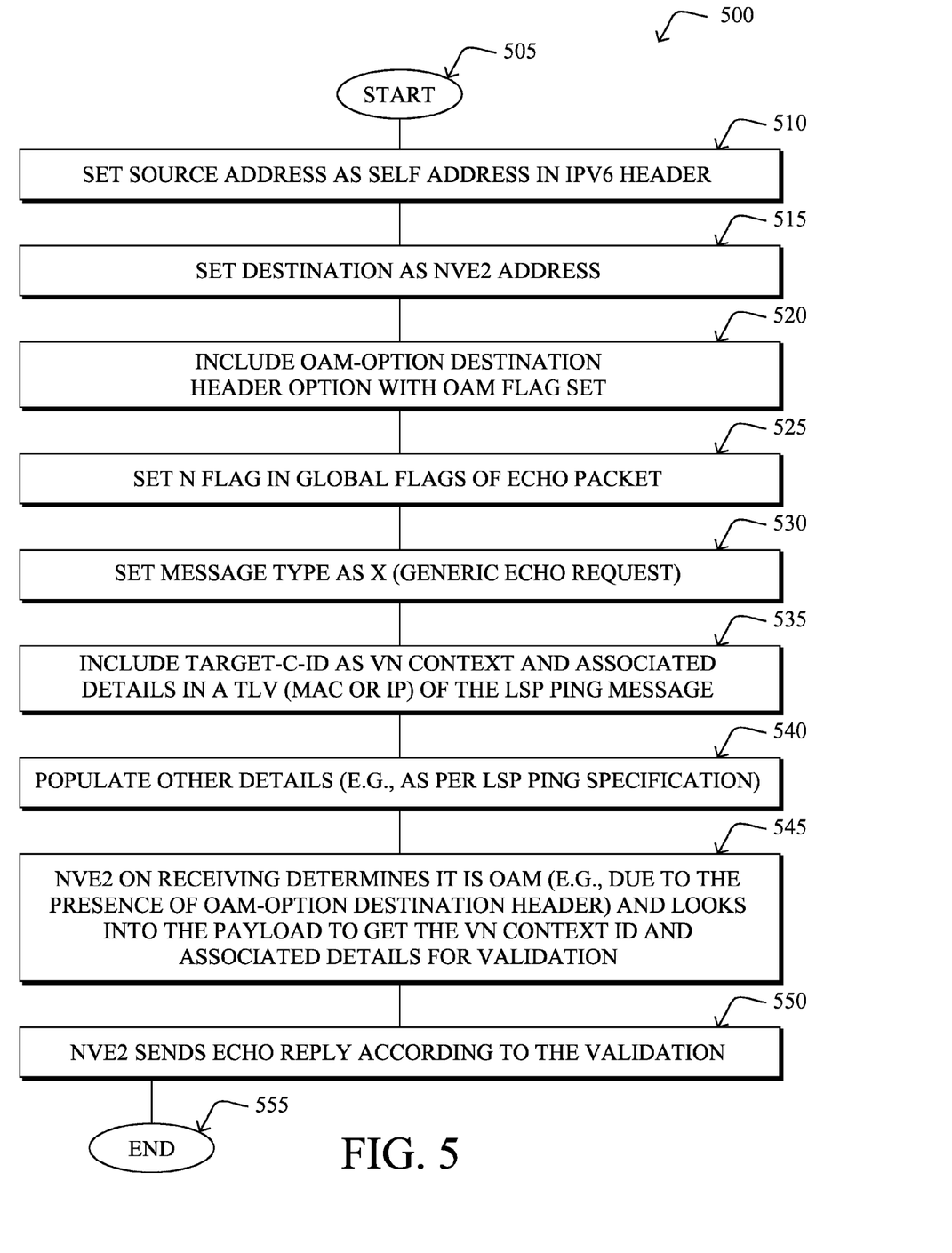
FIG. 5 illustrates an example simplified procedure for path-ping for IPv6 overlay virtualized networks.

As a first example use, FIG. 4 illustrates an example VN Context ID validation, where the ingress NVE (e.g., NVE1) can send an echo request 410 (a packet 300), and may receive an echo reply 420 from the egress NVE (e.g., NVE2), accordingly. When triggered from the initiator NVE in this instance, the techniques may generally be described with reference to procedure 500 as shown in FIG. 5. In particular, the procedure starts in step 505, and continues to step 510 where the ingress NVE sets the source address 311 of the echo packet as its own address in the IPv6 Header 310. In step 515, the destination 312 is set as the target egress address (e.g., NVE2), while an OAM-OPTION Destination Header Option may be included in step 520 with an OAM flag set (or other OAM indication), as described above. Additionally, in step 525, the indication that the echo packet is for overlay path validation (e.g., an "N" flag) may be set, and the message type may be set as a generic echo request (e.g., value X) in step 530. To finalize the echo packet 300, in step 535 the ingress NVE may also include a target-context-ID as the desired VN Context and associated details in a TLV (MAC or IP), and other details as required by the underlying protocol may be populated in step 540.

In step 545, the ingress NVE may then send the echo packet toward the egress NVE, such that the egress NVE (e.g., NVE2), upon receiving the same, will understand it is an OAM message (e.g., due to the presence of OAM-OPTION Destination Header) and further looks into the payload 320 to retrieve the VN Context ID and associated details for validation. (Notably, the egress NVE may understand it is an OAM message alternatively due to a "Next Header" as in RFC 3503, further looking into the global flag (N flag) to understand it is a non-LSP-Ping message, which helps interpret the payload as context ID TLVs (new TLVs/Sub-TLVs)). As such, in step 550, the egress NVE may send an echo reply according to the validation of the VN context information, and the procedure 500 ends in step 555.

Figure 6:
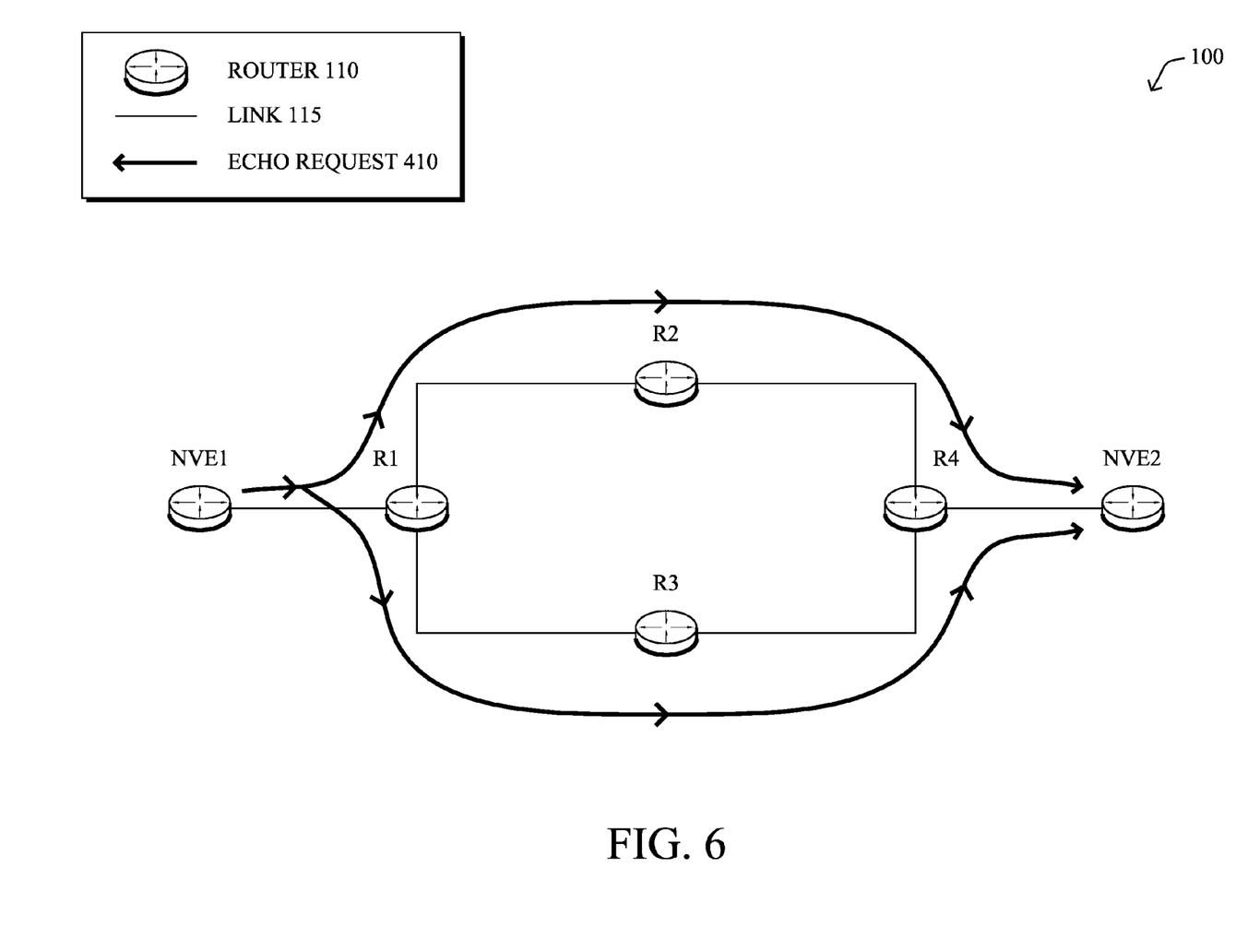
FIG. 6 illustrates an example of ECMP-traceroute for IPv6 overlay virtualized networks.
Figure 7:
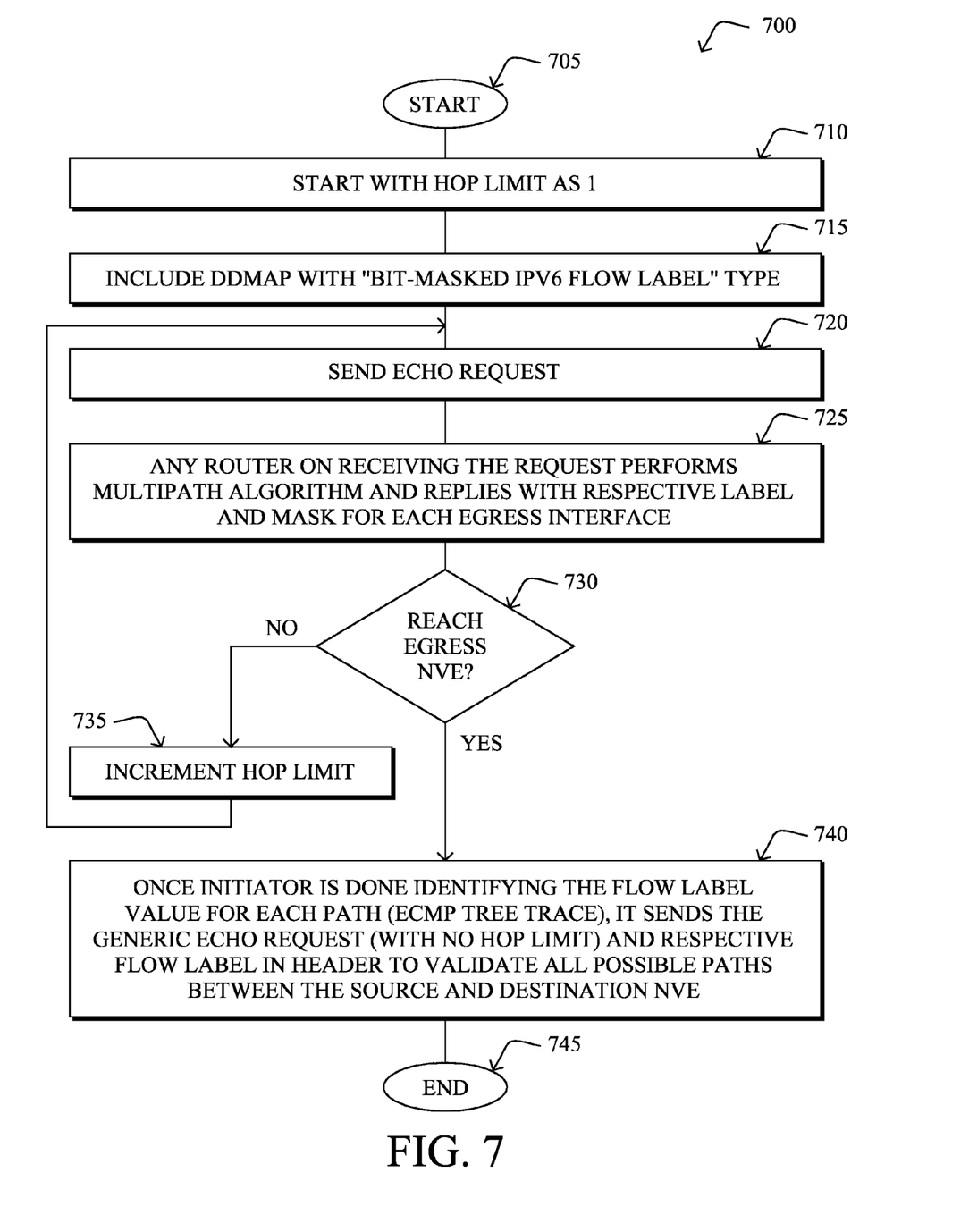
FIG. 7 illustrates an example simplified procedure for ECMP-traceroute for IPv6 overlay virtualized networks.

As a second example use, FIG. 6 illustrates an example of an ECMP tree trace (ECMP-traceroute), where each arrowhead on a request 410 solicits a response by a receiving intermediate device due to an incremental hop limit being reached (as per conventional traceroute techniques that will be understood by those skilled in the art). In order to effectively function in an ECMP overlay environment, the techniques herein, with reference particularly to procedure 700 of FIG. 7, provide the key components to allow such functionality. In particular, in addition to steps 510 through 540 in procedure 500 above, procedure 700 starts at step 705 and continues to step 710 where a hop limit value is started as "1" for the echo packet. By including multipath information 326 within the echo packet in step 715 (shown in FIG. 3 above), sending the echo packet toward the egress NVE in step 720 (e.g., sending a plurality of echo packets with incrementally increasing hop limits) causes each intermediate multipath receiver (e.g., R1) to reply with a respective flow label and mask for each egress interface of that multipath receiver in step 725 (e.g., after performing an appropriate multipath algorithm). For example, R1 may receive the echo request 410 with Multipath Information, and will reply with a respective label and mask for each egress interface (one towards R2 and another towards R3).

Notably, multipath information 326 may generally depend upon types of validation being performed, such as being a DDMAP with a newly defined "Bit-masked IPv6 Flow Label" type (or a "range" as opposed to a bit-mask). Additional extensions can be used for other types of validation as well as other sources of entropy for ECMP—for example, using a "Bit-masked generic route encapsulation (GRE) Key" or "Bit-masked Source UDP Port" as multipath types for other ECMP treetraces.

Until the traceroute reaches the egress NVE in step 730, the ingress NVE1 will continue the procedure until it reaches NVE2 (the egress NVE), thus performing the ECMP Tree Trace between NVEs (i.e., by incrementing the hop limit in step 735, and returning to step 720 to send a subsequent packet, accordingly). Once the Initiator NVE (ingress NVE) reaches the egress NVE in step 730, and is done with identifying the Flow Label value for each path (ECMP Tree trace), the ingress NVE may send the generic echo request (e.g., with Hop Limit as 255) and a respective Flow Label in the Header in step 740 to validate all possible paths between the source and destination NVEs. In other words, in response to reaching the egress NVE with the echo packet, the ingress NVE may send an echo packet toward the egress NVE on all available multipath paths using a corresponding flow label to cause the egress NVE to send an echo reply to the ingress NVE according to validation of the VN context information for each multipath path. The illustrative procedure 700 may then end in step 745.

Figure 8:
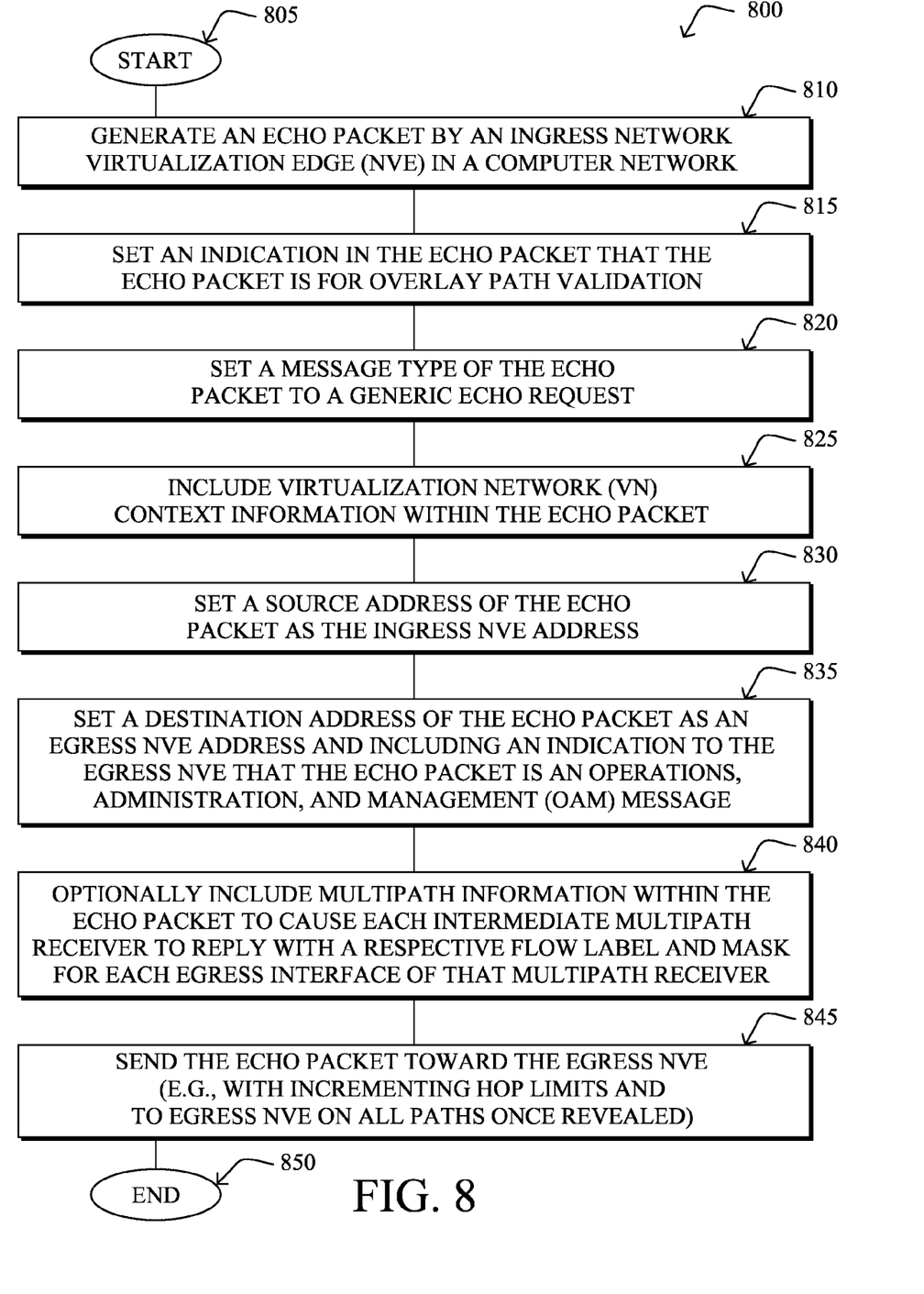
FIG. 8 illustrates an example simplified procedure for path-ping and ECMP-traceroute for IPv6 overlay virtualized networks.

Generally, FIG. 8 illustrates an example simplified procedure 800 for path-ping and ECMP-traceroute for IPv6 overlay virtualized networks in accordance with one or more embodiments described herein. The procedure 800 may start at step 805, and continues to step 810, where, as described in greater detail above, an ingress NVE generates an echo packet 300. Within that echo packet, in step 815 an indication may be set that the echo packet is for overlay path validation, and in step 820 a message type of the echo packet may be set to a generic echo request. In addition, in step 825, the ingress NVE includes VN context information within the echo packet, and set a source address of the echo packet as the ingress NVE address in step 830. Furthermore, in step 835, the destination address of the echo packet is set as an egress NVE address and including an indication to the egress NVE that the echo packet is an OAM message. Optionally, as described above, for ECMP-traceroute, in step 840 the ingress NVE may include multipath information within the echo packet to cause each intermediate multipath receiver to reply with a respective flow label and mask for each egress interface of that multipath receiver. Once the echo packet is configured, in step 845 the ingress NVE sends the packet toward the egress NVE, for example, directly to the NVE for validation, or with incrementing hop limits and then to the egress NVE on all paths once revealed. The illustrative procedure 800 ends in step 850.

It should be noted that while certain steps within procedures 500, 700, and 800 may be optional as described above, the steps shown in FIGS. 5, 7, and 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500, 700, and 800 are described separately, certain steps from each procedure may be incorporated into each other procedure, and the procedures are not meant to be mutually exclusive.

The techniques described herein, therefore, provide for path-ping and ECMP-traceroute for IPv6 overlay virtualized networks. In particular, the techniques herein provide an OAM solution for NVO3 scenarios, which includes ECMP treetrace for NVO3 and NV context validation. Additionally, the echo packets described above are easy to implement, and are scalable and extendable for future use cases, preventing the necessity of performing brute force ICMP ping processes, as mentioned above.

While there have been shown and described illustrative embodiments that provide for path-ping and ECMP-traceroute for IPv6 overlay virtualized networks, it is to be understood that various other adaptations and modifications may be made within the spirit and scope of the embodiments herein. For example, the embodiments have been shown and described herein with relation to NVO3 networks in particular. However, the embodiments in their broader sense are not as limited, and may, in fact, be used with other types of IP-based overlay networks. In addition, while certain protocols are shown, such as MPLS, and particularly MPLS LSP-Ping as an underlying echo packet structure, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    generating an echo packet by an ingress network virtualization edge (NVE) in a computer network;
    setting an indication in a header of the echo packet that the echo packet is for overlay path validation;
    setting, in the header, a message type of the echo packet to a generic echo request;
    including, in a payload of the echo packet, virtualization network (VN) context information within the echo packet;
    setting, in the header, a destination address of the echo packet as an egress NVE address and including, in the payload, an indication to the egress NVE that the echo packet is an operations, administration, and management (OAM) message; and
    sending the echo packet toward the egress NVE.

2. The method as in claim 1, wherein sending the echo packet toward the egress NVE is to cause the egress NVE to send an echo reply to the ingress NVE according to validation of the VN context information.

3. The method as in claim 1, further comprising:
    including multipath information within the echo packet to cause each intermediate multipath receiver to reply with a respective flow label and mask for each egress interface of that multipath receiver; and wherein sending the echo packet toward the egress NVE comprises sending a plurality of echo packets with incrementally increasing hop limits.

4. The method as in claim 3, further comprising:
in response to reaching the egress NVE with the echo packet, sending one or more additional echo packets toward the egress NVE on all available multipath paths using a corresponding flow label to cause the egress NVE to send an echo reply to the ingress NVE according to validation of the VN context information for each multipath path.

5. The method as in claim 3, wherein the multipath information is selected from a group consisting of: an IPv6 flow label; a generic route encapsulation (GRE) key; and a source user datagram protocol (UDP) port.

6. The method as in claim 5, wherein the multipath information comprises a bit-mask.

7. The method as in claim 1, wherein including the indication to the egress NVE that the echo packet is an OAM message comprises a specific user datagram protocol (UDP) port and destination port.

8. The method as in claim 1, wherein including the indication to the egress NVE that the echo packet is an OAM message comprises an explicit indication.

9. The method as in claim 8, wherein the explicit indication comprises an OAM-option destination header option with a particular flag set.

10. The method as in claim 1, wherein the VN context information comprises a VN context identifier (ID) and associated VN context details.

11. The method as in claim 1, wherein the VN context information is included within a type-length-value (TLV) field of the echo packet.

12. The method as in claim 1, wherein the indication in the echo packet that the echo packet is for overlay path validation comprises a particular flag set within a global flags field of the echo packet.

13. An apparatus, comprising:
one or more network interfaces to communicate as an ingress network virtualization edge (NVE) in a computer network;
a processor coupled to the network interfaces and adapted to execute one or more processes; and
a memory configured to store a process executable by the processor, the process when executed operable to:
generate an echo packet;
set an indication in a header of the echo packet that the echo packet is for overlay path validation;
set, in the header, a message type of the echo packet to a generic echo request;
include, in a payload of the echo packet, virtualization network (VN) context information within the echo packet;
set, in the header, a destination address of the echo packet as an egress NVE address and including, in the payload, an indication to the egress NVE that the echo packet is an operations, administration, and management (OAM) message; and
send the echo packet toward the egress NVE.

14. The apparatus as in claim 13, wherein sending the echo packet toward the egress NVE is to cause the egress NVE to send an echo reply to the ingress NVE according to validation of the VN context information.

15. The apparatus as in claim 13, wherein the process when executed is further operable to:
include multipath information within the echo packet to cause each intermediate multipath receiver to reply with a respective flow label and mask for each egress interface of that multipath receiver; and
send a plurality of echo packets toward the egress NVE with incrementally increasing hop limits.

16. The apparatus as in claim 15, wherein the process when executed is further operable to:
in response to reaching the egress NVE with the echo packet, send one or more additional echo packets toward the egress NVE on all available multipath paths using a corresponding flow label to cause the egress NVE to send an echo reply to the ingress NVE according to validation of the VN context information for each multipath path.

17. The apparatus as in claim 15, wherein the multipath information is selected from a group consisting of: an IPv6 flow label; a generic route encapsulation (GRE) key; and a source user datagram protocol (UDP) port.

18. The apparatus as in claim 13, wherein including the indication to the egress NVE that the echo packet is an OAM message comprises one of either a specific user datagram protocol (UDP) port and destination port or an explicit indication.

19. The apparatus as in claim 13, wherein the VN context information comprises a VN context identifier (ID) and associated VN context details.

20. A tangible, non-transitory, computer-readable media having software encoded thereon, the software, when executed by a processor on an ingress network virtualization edge (NVE) in a computer network, operable to:
generate an echo packet;
set an indication in a header of the echo packet that the echo packet is for overlay path validation;
set, in the header, a message type of the echo packet to a generic echo request;
include, in a payload of the echo packet, virtualization network (VN) context information within the echo packet;
set, in the header, a destination address of the echo packet as an egress NVE address and including, in the payload, an indication to the egress NVE that the echo packet is an operations, administration, and management (OAM) message; and
send the echo packet toward the egress NVE.

21. The computer-readable media as in claim 20, wherein sending the echo packet toward the egress NVE is to cause the egress NVE to send an echo reply to the ingress NVE according to validation of the VN context information.

22. The computer-readable media as in claim 20, wherein the software when executed is further operable to:
include multipath information within the echo packet to cause each intermediate multipath receiver to reply with a respective flow label and mask for each egress interface of that multipath receiver; and
send a plurality of echo packets toward the egress NVE with incrementally increasing hop limits.

23. The computer-readable media as in claim 20, wherein the software when executed is further operable to:
in response to reaching the egress NVE with the echo packet, send one or more additional echo packets toward the egress NVE on all available multipath paths using a corresponding flow label to cause the egress NVE to send an echo reply to the ingress NVE according to validation of the VN context information for each multipath path.

* * * * *